US011935091B2

(12) United States Patent
Ernster et al.

(10) Patent No.: US 11,935,091 B2
(45) Date of Patent: *Mar. 19, 2024

(54) SYSTEMS AND METHODS FOR TARGETED ADVERTISING BASED ON EXTERNAL FACTORS

(71) Applicant: Yahoo AD TECH LLC, New York, NY (US)

(72) Inventors: Toby Ernster, Guildford (GB); Seth Mitchell Demsey, Dulles, VA (US); Edward Barnes, Ware (GB)

(73) Assignee: Yahoo Ad Tech LLC, New York, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/303,368

(22) Filed: May 27, 2021

(65) Prior Publication Data

US 2021/0287247 A1 Sep. 16, 2021

Related U.S. Application Data

(63) Continuation of application No. 14/670,184, filed on Mar. 26, 2015, now Pat. No. 11,049,132.

(51) Int. Cl.
*G06Q 30/00* (2023.01)
*G06Q 30/0242* (2023.01)
*G06Q 30/0251* (2023.01)

(52) U.S. Cl.
CPC ..... *G06Q 30/0244* (2013.01); *G06Q 30/0269* (2013.01)

(58) Field of Classification Search
None
See application file for complete search history.

(56) References Cited

U.S. PATENT DOCUMENTS 6,519,571 B1 * 2/2003 Guheen ................. G06Q 30/02
705/14.66
8,880,677 B2 * 11/2014 Julia ..................... H04L 67/306
709/224

(Continued)

FOREIGN PATENT DOCUMENTS

KR 101161084 B1 * 7/2012 ............. H04L 67/04
KR 101161084 B1 7/2012

(Continued)

OTHER PUBLICATIONS

Google Ad Scripts. Ad Customizer. (Oct. 28, 2014). Retrieved online Mar. 8, 2021. https://developers.google.com/google-ads/scripts/docs/solutions/customizer (Year: 2014).*

(Continued)

*Primary Examiner* — James A Reagan
(74) *Attorney, Agent, or Firm* — Bookoff McAndrews, PLLC

(57) ABSTRACT

Systems and method are disclosed for providing advertisements to users by determining the occurrence of user defined external triggering events comprising a moment. One method comprises defining a set of conditions or criteria that define a moment, collecting data associated with said set of conditions or criteria, evaluating whether the conditions or criteria are satisfied and whether the user defined moment has occurred, executing an advertisement campaign associated with said user defined moment, transmitting an advertisement associated with said user defined moment to a target user, and modifying said advertisement in accordance with changes in the data associated with the conditions or criteria.

17 Claims, 8 Drawing Sheets

(56) References Cited

U.S. PATENT DOCUMENTS

| | | | | |
|---|---|---|---|---|
| 2008/0120176 | A1* | 5/2008 | Batni | G06Q 30/0211 705/14.13 |
| 2008/0160956 | A1* | 7/2008 | Jackson | H04M 3/02 455/406 |
| 2008/0262914 | A1* | 10/2008 | Suveyke | G06Q 30/02 705/14.54 |
| 2009/0327331 | A1* | 12/2009 | Mathew | G06Q 30/02 707/999.102 |
| 2010/0190547 | A1* | 7/2010 | Okada | G07F 17/32 463/25 |
| 2010/0269132 | A1* | 10/2010 | Foti | H04N 21/25891 725/32 |
| 2011/0044169 | A1* | 2/2011 | Liu | H04W 28/021 370/235 |
| 2011/0213655 | A1* | 9/2011 | Henkin | G06Q 30/00 707/E17.061 |
| 2011/0276396 | A1* | 11/2011 | Rathod | G06Q 20/10 707/706 |
| 2013/0059607 | A1* | 3/2013 | Herz | G06Q 30/0261 455/456.3 |
| 2013/0138507 | A1* | 5/2013 | Kumar | G06Q 30/0251 705/14.54 |
| 2014/0114760 | A1* | 4/2014 | Reinshagen | G06Q 30/0241 705/14.54 |
| 2014/0121007 | A1* | 5/2014 | Santini | G06Q 50/01 463/29 |
| 2014/0180825 | A1* | 6/2014 | Ramer | G06Q 30/0267 705/14.64 |
| 2014/0249927 | A1* | 9/2014 | De Angelo | G06Q 30/0269 705/14.64 |
| 2014/0304130 | A1* | 10/2014 | Winters | G06Q 30/0255 705/35 |
| 2015/0256866 | A1* | 9/2015 | Finnerty | H04N 21/25891 725/32 |
| 2015/0310484 | A1* | 10/2015 | Haile | G06Q 30/0246 705/14.45 |
| 2015/0339707 | A1* | 11/2015 | Harrison | G06F 16/00 705/14.5 |
| 2016/0260123 | A1* | 9/2016 | Mishra | G06Q 30/0244 |
| 2016/0283971 | A1* | 9/2016 | Ernster | G06Q 30/0269 |

FOREIGN PATENT DOCUMENTS

| | | | |
|---|---|---|---|
| WO | 2010138512 A1 | 12/2010 | |
| WO | WO-2010138512 A1 * | 12/2010 | G06Q 30/0245 |
| WO | 2009099880 A3 | 6/2011 | |
| WO | WO-2009099880 A3 * | 6/2011 | G06Q 30/0241 |

OTHER PUBLICATIONS

McKinsey and Company. Marketing & Sales. Big Data, Analytics, and the Future of Marketing & Sales. (Mar. 15, 2015). Retrieved online Mar. 8, 2021, https://www.mckinsey.com/~/media/McKinsey/Business%20Functions/Marketing%20and%20Sales/Our%20Insights/EBook%20Big%20data%20analytics%20and%20the%20future%20of%20marketing%20sales/Big-Data-eBook.ashx (Year: 2015).*

Google Ad Scripts. Ad Customizer. (Oct. 28, 2014). Retrieved online Mar. 8, 2021. https://developers.google.com/google-ads/scripts/docs/solutions/customizer.

McKinsey and Company. Marketing & Sales. Big Data, Analytics, and the Future of Marketing &Sales. (Mar. 15, 2015). Retrieved online Mar. 8, 2021. https://www.mckinsey.com/~/media/mckinsey/business%20functions/marketing%20and%20sales/our%20insights/ebook%20big%20data%20analytics%20and%20the%20future%20of%20marketing%20sales/big-data-ebook.pdf.

* cited by examiner

SYSTEMS AND METHODS FOR TARGETED ADVERTISING BASED ON EXTERNAL FACTORS

CROSS-REFERENCE TO RELATED APPLICATION(S)

This patent application is a continuation of and claims the benefit of priority to U.S. application Ser. No. 14/670,184, filed on Mar. 26, 2015, the entirety of which is incorporated herein by reference.

TECHNICAL FIELD

The present disclosure relates generally to systems and methods for an advertising management platform configured to retrieve data from a plurality of external sources. More particularly, and without limitation, the present disclosure relates to systems and methods for targeting personalized advertising content to users when certain preset conditions and/or criteria have been satisfied.

BACKGROUND

Due to the vast and increasing amount of traffic generated by consumers on the Internet, businesses continue to seek more effective means to advertise their goods and services online. An advertiser is generally a merchant of goods and/or services willing to pay to have its advertisements presented to consumers in an online environment, on television, or on the radio. The advertiser may use its own data about consumers and/or a data provided in order to determine to which consumers to present their advertisements. Such consumer data may include demographic information, preferences, interests, etc., which are used to select and serve a particular ad to a particular customer.

In an effort to spend their online advertising budgets on those consumers who will most likely be interested in their ads, advertisers develop "ad campaigns" or marketing plans that identify certain types of consumers as targets for given products or services. In other cases, advertisers may be unsure of what types of consumers are most likely to respond to a given product and/or advertisement, and may wish to gather specific information about when the consumer is more inclined to buy the advertised product. In some cases, advertisers may be particularly interested in the correlation between certain external factors or triggering events and the increased probability that a consumer will buy an advertised product. Therefore, the advertisers may wish to initiate a targeted advertisement or marketing strategy (e.g., for a particular good, service, and/or ad) based on the gathered information and the occurrence of external factors or events.

The present disclosure is directed to overcoming one or more of the above-described challenges.

SUMMARY OF THE DISCLOSURE

Embodiments disclose systems and methods for providing advertisements to users based on external factors.

According to certain embodiments, computer-implemented methods are disclosed for providing advertisements to users by determining the occurrence of user defined external triggering events comprising a moment. One method includes: selecting a plurality of conditions that define a moment; collecting data associated with the defined moment; evaluating the data collected to determine if the conditions are satisfied and whether the defined moment has occurred; executing an advertisement campaign associated with the occurrence of the defined moment; transmitting an advertisement associated with the defined moment to a targeted user; and modifying the advertisement based on a change in the conditions.

According to certain embodiments systems are disclosed for providing advertisements to users by determining the occurrence of user defined external triggering events comprising a moment. One system includes a data storage device that stores instructions for providing advertisements to users by determining the occurrence of user defined external triggering events comprising a moment; and a processor configured to execute the instructions to perform a method including: selecting a plurality of conditions that define a moment; collecting data associated with the defined moment; evaluating the data collected to determine if the conditions are satisfied and whether the defined moment has occurred; executing an advertisement campaign associated with the occurrence of the defined moment; transmitting an advertisement associated with the defined moment to a targeted user; and modifying the advertisement based on a change in the conditions.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory and are not restrictive of the scope of disclosed embodiments, as set forth by the claims.

BRIEF DESCRIPTION OF THE DRAWINGS

The accompanying drawings, which are incorporated in and constitute a part of this specification, illustrate several embodiments of the disclosure, and together with the description, serve to explain the principles of the disclosure.

DETAILED DESCRIPTION OF THE EMBODIMENTS

Figure 1:
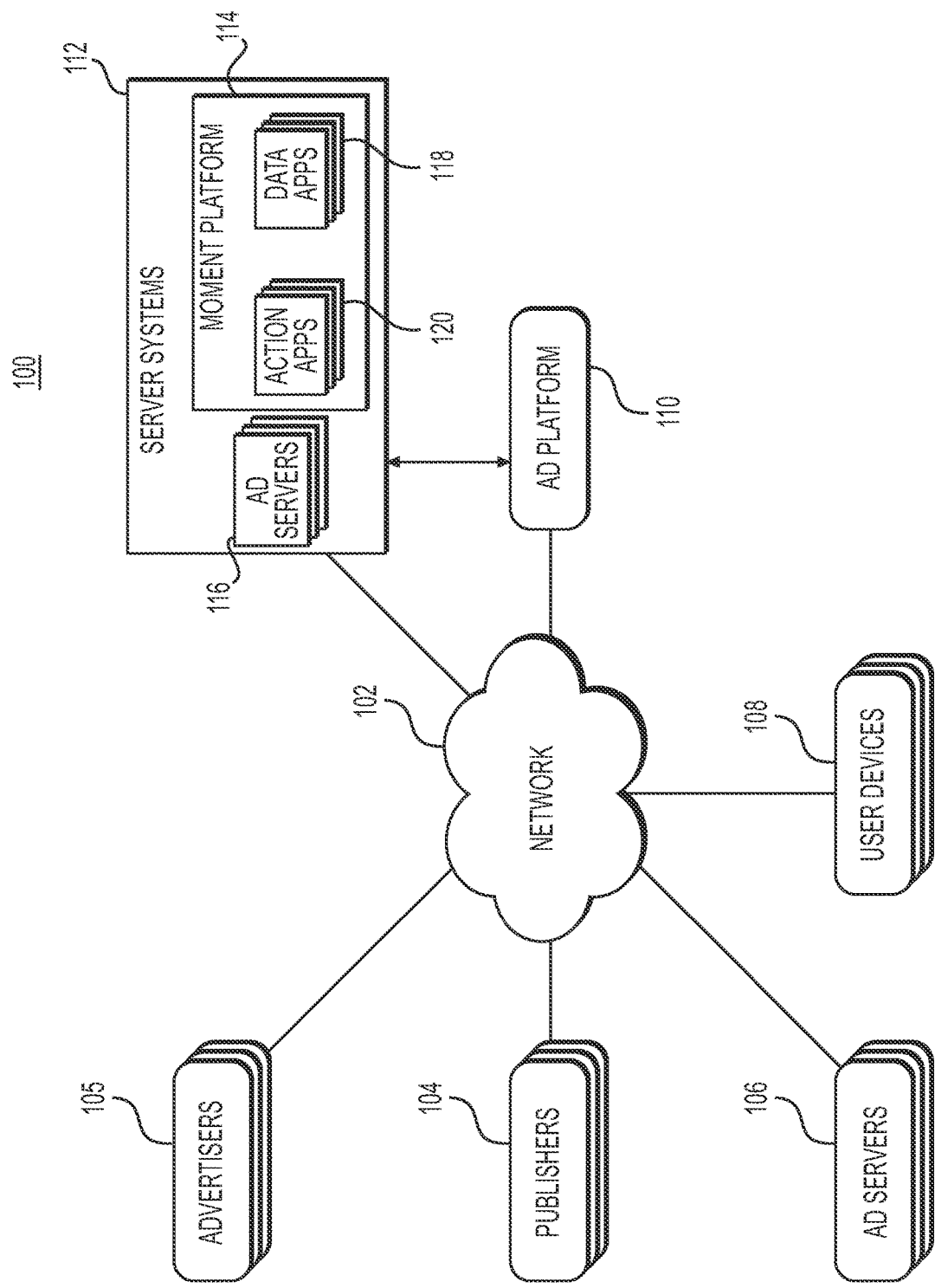
FIG. 1 depicts an exemplary advertising "moments" platform and server systems within an exemplary online advertising environment, according to exemplary embodiments of the present disclosure.

Reference will now be made in detail to exemplary embodiments, examples of which are illustrated in the accompanying drawings. Wherever possible, the same reference numerals will be used throughout the drawings to refer to the same or like parts.

As described above, in some cases, advertisers may wish to initiate a targeted advertisement or marketing strategy (e.g., for a particular good, service, and/or ad) based on the occurrence of external factors or events, such as events occurring "in the real world," outside the context of the advertising network, the Internet, or the virtual environment. Implementing a targeted advertisement campaign based on external factors may involve an advertisement management platform retrieving data from a plurality of external sources, beyond those device IDs, cookie IDs, ad servers, publisher servers, etc. traditionally accessed in an online advertising regime. Once desired external data is collected, the data may be evaluated against certain preset conditions and/or criteria to determine whether the conditions have been satisfied. The specific conditions and/or criteria may be selected by the user or advertising agency and may be defined as a "moment." Once the moment occurs, an advertising campaign may be triggered. In some cases, the existence or occurrence of a defined "moment" may trigger the modification of an advertising campaign, such as by modifying impression and/or buying parameters (e.g., cost per impression, targeting, etc.) or by modifying a creative displayed for the advertising campaign based on the identity and characteristics of the "moment" currently taking place.

For purposes of illustration, one example of defining a moment may involve setting a moment as occurring when, e.g., the NASDAQ stock index experiences above a threshold rise (e.g., >=10%) on a given day, and when, e.g., the New York City area experiences certain (e.g., mostly sunny) weather conditions. If these two conditions are true, then the advertisement management platform might trigger an advertisement featuring a product desired or suitable under those conditions, say for a BMW convertible targeted to high net worth individuals in the New York City area. When the conditions cease to be true (i.e., when the weather in New York City ceases to be sunny, or when the NASDAQ stock index does not experience a 10% rise in a day), then the advertisement platform may pause the campaign until the conditions become true again.

In one embodiment, the advertisement management platform may be configured to execute based upon having data applications and/or action applications that can be installed and deployed independently within the "moments" platform, thereby allowing customization and integration of new data sources, such as first party data or any programmatically accessible resource. Data applications may be integrated into the advertisement management platform to facilitate the ingestion of data from external sources, with each data application being linked to a different source of data, e.g., an API of a news service, and so on. Action applications may also be integrated into the advertisement management platform to trigger operations, i.e., actions, in any external system, such as by starting or modifying advertising campaigns based on the presence of a moment, as defined by external data ingested from the data applications. This configuration also may enable advertisement creatives to be dynamically updated with contextually relevant information obtained from a plurality of data sources.

FIG. 1 depicts an exemplary online advertising environment 100 in which a system may be provided for performing targeted advertising based on external factors, consistent with the disclosed embodiments. As shown in FIG. 1, the environment 100 may include advertisers 105, publishers 104, ad servers 106, user devices 108, an ad platform 110, and an advertising moments system 112, all disposed in communication with each other via a network 102. In one embodiment, advertising moments system 112 may include a plurality of ad servers 116 and a moment platform 114 comprising a plurality of data applications 118 and action applications 120. It should be appreciated that the depicted embodiment is only exemplary in nature, and may be modified in accordance with any desired arrangement of ad servers, ad networks, and/or ad platforms. For instance, ad servers 106 may be implemented within and executed by ad platform 110. Ad servers 116 may be the same or different from ad servers 106, and also may be implemented within and executed by ad platform 110. Any of ad servers 106, ad platform 110, and ad servers 116 may be "third-party" to the advertising moments system 112. For example, advertising moments system 112 may be performed as a service to third-party ad networks, by which the operator of advertising moments 112 provides a "moments service" as a service to other third-party advertising networks.

As will be described in more detail above, each of advertisers 105, publishers 104, ad servers 106, user devices 108, ad platform 110, and advertising moments system 112 may include one or more computing devices, such as a personal computer, a desktop computer, a laptop computer, a handheld computing device, a mobile phone, smartphone, a server, distributed server system, and/or any other type of computing device. The network 102 may include any combination of networks, such as, for example, the Internet, a dedicated intranet, or any other type of electronic communication network known in the art.

Advertisers 105 may include one or more computing devices associated with any business entities having online advertisements, such as banner ads, pop-ups, etc. desired to be delivered to online users. Advertisers 105 may interact with publishers 104, ad servers 106, data applications 118, and/or action applications 120 via network 102 to communicate, among other things, ad information, targeting information, consumer information, ad campaign information, and/or other related advertising information. Advertisers 105 may select the advertisements that are transmitted by one or more of ad servers 106, ad platform 110, and advertising moments system 112 via the network 102 to the user devices 108. In turn, the user devices 108 display the selected advertisements to the user. The advertisers 105 transmit targeting information to the advertising moments system 112. In another embodiment, the advertiser 105 provides the advertising moments system 112 with multiple advertisements, each of which is customized for a particular moment, circumstance, or combination of satisfied conditions and/or criteria. In another embodiment, changes in the input data from the external factors may result in real time modifications to the ad creative.

Publishers 104 may include one or more computing devices associated with any business entities having inventories of available online advertising space. For example, publishers 104 may include online content providers, search engines, e-mail services, content websites, news websites, or any other or websites attracting the online traffic of users. Publishers 104 may interact with advertisers and/or ad servers over network to communicate site information, demographic information, browser cookie information, user information, and/or any other information in connection with requesting ads for available advertising space on their websites. For example, in response to user devices accessing websites associated with publishers, the web browsers of the user devices may generate and send to ad servers over network ad requests requesting ad servers to serve ads to fill the available ad space on their websites. The ad requests may contain, for example, cookie information (e.g., a unique identifier), user information, and/or any other information that may be used to fulfill an ad request.

Ad servers 106, 116 may include one or more computing devices associated with any business entities that store and/or process advertising information (e.g., ad campaign information) received from advertisers and/or ad inventory information received from publishers 104 or advertisers 105, either directly or indirectly. For example, ad servers 106, 116 may include one or more remote ad networks configured to serve ads in response to ad requests from publishers 104 or advertisers 105, based on the advertising information received from advertisers 105 and/or on ad request information received from publishers 104 or advertisers 105.

Ad server 106, 116 may also store, keywords, targeting information, banner advertisements, display advertisements, text, images, contextual advertisements, search advertisements, audio advertisements or mobile advertisements that describe a good, service or thing that an advertiser 105 wishes to promote to a user. Ad servers 106, 116 may also be configured to serve ads based on contextual targeting of websites, search results, user profile information, and/or communication with the advertising moments system 112 when a moment has been triggered. For example, in response to receiving an ad request from a publisher 104 or advertiser 105, ad servers 106, 116 may communicate with the advertising moments system 112 to determine whether a defined moment has occurred, and if so, facilitate bids on the available advertising space on the webpage of the publisher 104.

As described above, in one embodiment, advertising moments system 112 may interact together with advertisers 105, publishers 104, ad servers 106, user devices 108, and ad platform 110 to automate external data collection and actions triggering operations for advantageously delivering external moments-triggered advertisements to users. Specifically, advertising moments system 112 may receive advertisements, campaign preferences, and moments parameters from advertisers 105, receive inventory information from publishers 104, and execute data applications 118 and action applications 120 to identify moments based on external data and to deliver moments-optimized advertising of advertisers 105 to user devices 108 on websites of publishers 104.

The advertising moments system 112 may be configured to define a moment by specifying conditions and/or criteria which are measured against by collecting data from a variety of external sources using the data applications 118, including AOL® applications. Of course, the specifying conditions and/or criteria may be informed based on preferences and information received from advertisers 105. For example, an advertiser may know that its target demographic is highly responsive during certain weather and/or stock market conditions. Alternatively, the advertiser may know that its target demographic is highly primed for buying when the end of a quarter falls on a weekend, for example. Thus, the advertisers 105 may transmit targeting information to the advertising moments system 112 in order to define a moment. In some embodiments, the targeting information defining a moment may specify that certain criteria are required and other criteria are optional. The advertising moments system 112 may store the advertisement and targeting information defining a moment within moment platform 114. In one embodiment, the advertisement management platform 110 may include AOL Inc.'s Marketing Moments, or AOL AdAware.

Data applications 118 of moment platform 114 may represent any modules or devices configured to collect information about external factors, such as stock prices, oil and gas prices, the weather in a given locale, sports teams' scores, social media trends, etc. In one embodiment, data applications 118 may be configured to obtain external information by visiting web servers over the network 102. For example, data applications 118 may be server modules programmed to visit websites on the Internet on a periodic, event-triggered, or consistent basis to obtain information available on the Internet regarding one or more various external events or information pertinent to one or more defined moments. For example, if a given moment is contingent on the present day being a relatively "slow news day," then one of the data applications 118 may be configured to visit a prominent news website to determine a volume of news pieces being published online that day. If a given moment is contingent on the present day being at the end of a fiscal quarter, then one of the data applications 118 may be configured to visit a time and date website, and/or a corporate investment page, to determine whether the current day is at the end of a given company's fiscal quarter. One or more of data applications 118 may be configured to make requests of any API of the moments platform 114 or of any other company, e.g., of advertisers 105, publishers 104, or any other entity relevant to a given moment. Thus, data applications 118 may be virtually any device, module, or application configured to provide real-time information on any external event or condition, such as stock prices, oil/gas prices, sports scores, weather conditions, social media trends etc. The collected data may be harvested and provided to moments platform 114, which evaluates the data in order to determine whether a defined moment has occurred. In some embodiments, data applications 118 may also collect, index, and segment demographic and other information about users to build user profiles, for use in defining the present of a moment. The user profiles may then be provided to ad servers 106, advertisers 105, and/or ad exchanges to target users with online advertisements tailored to their interests according to a defined moment.

The action applications 120 may represent any modules or devices configured to trigger external actions based on the occurrence of a defined moment. The action applications 120 may interact with moment platform 114 to read and evaluate external data collected by data applications 118, determine whether a defined moment is "true" or "false," and then communicate with the ad servers 106, 116, publishers 104, advertisers 105, ad platform 110, and/or the advertising moments system 112 to trigger one or more advertising events or operations, such as the initiation or modification of an advertising campaign for a specific product based on the satisfaction or ending of a defined moment.

For example, a user (e.g., an editor, marketing manager, chief marketing officer (CMO), etc. of a company, e.g., an advertiser 105) may define a moment by selecting from among plurality of data sources and may use an AOL® mobile application. Sources may include data from a stock exchange (e.g., NASDAQ, NYSE, Dow Jones) and then selecting a ticker and percent gain (e.g., AOL, TWTR, BAC, AAPL); a weather application, and then selecting a city (e.g., New York, Washington, London), and temperature conditions (e.g., greater than 15 degrees Celsius), and meteorological conditions (e.g., sunny, light snow, high winds); a sports team (e.g., New York Yankees, Washington Capitals, Chelsea FC), and then selecting a margin of victory; oil and gas prices (e.g., WTI crude oil, NYMEX heating oil, Western Canadian Select) and then selecting a percent gain; social media platforms (e.g., Facebook, Twitter, LinkedIn) and then selecting a trending topic (#USElections2016, #StanleyCupPlayoffs2016, #SuperBowIXLX) and so on.

Once the conditions and/or criteria of a given moment are identified as being true, and the defined moment is identified as being present by the satisfaction of its composite criteria, then advertising moments system 112 may initiate any action associated with the presence of the moment. For example, an advertising campaign for a particular brand or product may be initiated for targeting specific users, and/or an advertising campaign and/or ad creative may be modified in real time using the collected data. Specifically, in one embodiment, the ad creative associated with a moment may have its design and/or content updated in real time based on the presence and/or quantity/quality of the defined moment. For example, the ad creative may display data and/or information associated with the defined moment. By way of example, if the moment is defined to occur when the DOW is up 5%, the ad creative may be modified to say "Markets are up! Buy now!" whereas if the DOW is up 10%, the ad creative may be modified to say "Markets are sky high! Don't wait!" Thus, the ad creative may have any of its artwork, design, copy, text, numbers, placement, shape, size, etc. modified in a customized manner based on external data that went into the identification of the presence of the moment associated with that ad creative.

In one embodiment, the advertisements, i.e., creatives, associated with a given moment may be stored in the ad server 106, modified by the advertising moments system 112, and pushed to the advertiser 105, publisher 104 or to the user directly. Upon identifying the presence of an advertiser and/or system defined moment, the advertising moments system 112 may select the advertisements that are transmitted via the network to the user devices. In turn, the user devices 108 display the advertisements to users, e.g., through a browser, mobile application, or other advertising portal.

An exemplary, non-limiting embodiment will now be described solely for purposes of illustration. For example, BMW is a luxury car company that sells high end vehicles around the world, and that may have advertising campaigns tailored and unique to specific high-volume cities, such as New York City, Washington D.C., and London. BMW may have advertisements that target specific segments, such as high net worth individuals, baby boomers, young professionals, and so on. BMW also may have a varied line of vehicles, each being targeted to specific users. For example, for young professionals who seek to maintain an active lifestyle, BMW markets the X5 sport utility vehicle that departs from its conventional line of sports and luxury sedans. In some cases, by way of illustration, BMW may wish to specifically target high net worth consumers in New York City with a tailored ad creative at the moment when the NASDAQ experiences a 10.00% rise in value and the weather conditions in New York City are warm, sunny, and greater than 15 degrees Celsius.

To execute an advertisement campaign coinciding with the above stated conditions, or moment, or any other defined moment, BMW may log into the advertising moments system 112 and update its defined moment by selecting the criteria and/or conditions and specifying that its advertisement for a particular product should be displayed to users having a high net worth.

Accordingly, in some embodiments, a computer system for managing and selecting advertisements includes client devices communicatively connected to an advertisement engine, e.g., search engine, and advertisement management system.

As one skilled in the art appreciates, the computer system includes hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and non-removable media, and media readable by a database, a switch, and various other network devices. Network switches, routers, and related components are conventional in nature, as are means of communicating with the same. Computer-readable media are computer-storage media. Computer-storage media include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory components can store data momentarily, temporarily, or permanently.

As one skilled in the art appreciates, the computer system includes hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and non-removable media, and media readable by a database, a switch, and various other network devices. Network switches, routers, and related components are conventional in nature, as are means of communicating with the same. Computer-readable media are computer-storage media. Computer-storage media include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory components can store data momentarily, temporarily, or permanently.

Figure 2:
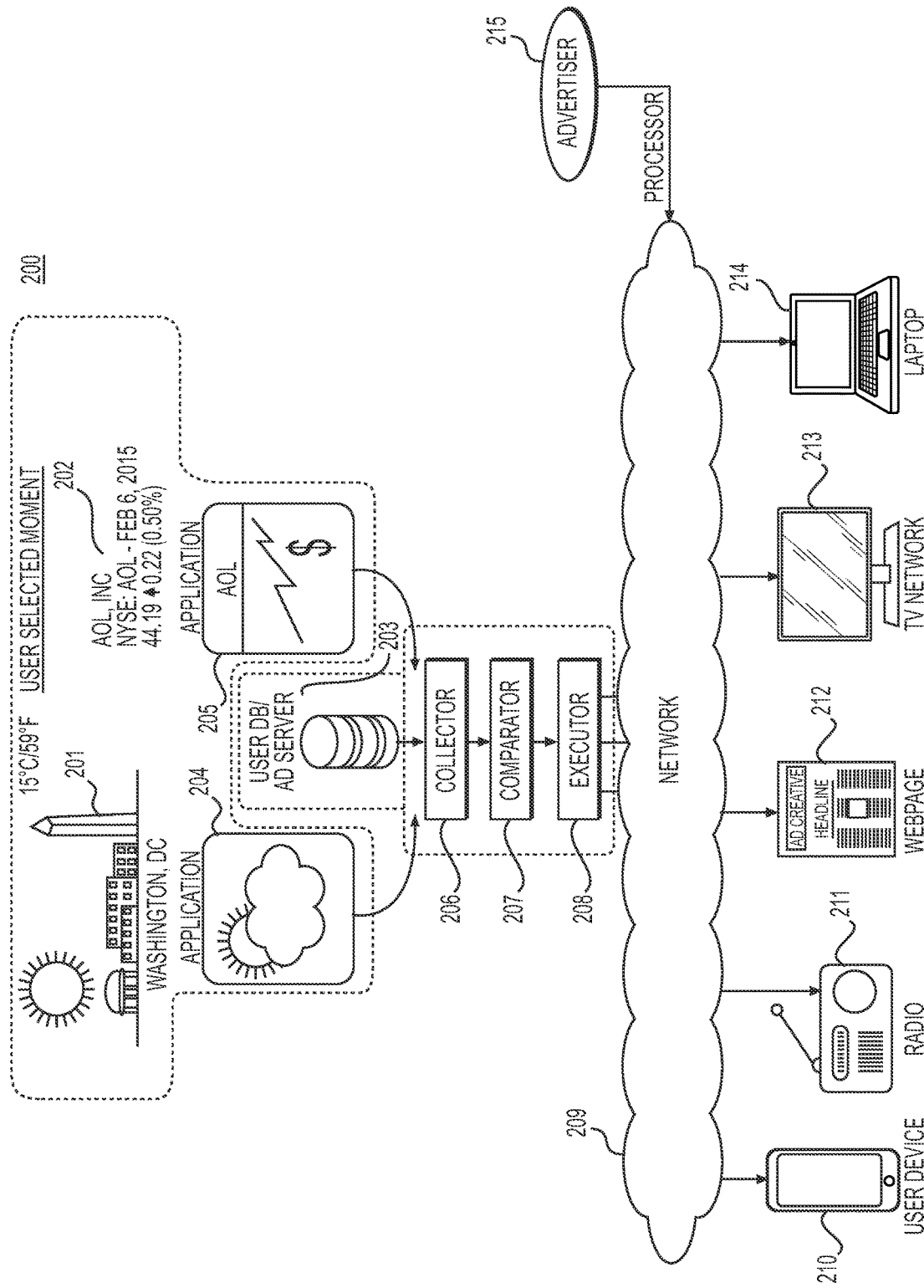
FIG. 2 depicts a schematic diagram of an exemplary advertising "moment" implemented in an online advertisement, according to exemplary embodiments of the present disclosure.

FIG. 2 depicts an exemplary representation of an advertising moments platform 200, consistent with disclosed embodiments. Although shown embodied as a single entity connected to a network, advertising moments platform 200 may be alternatively or additionally be implemented by one or more other entities on a network. As shown in FIG. 2, advertising moments platform 200 may include a collector 206, a comparator 207, an executor 208, and a user database/ad server 203.

In one embodiment, a user, such as an advertiser, editor, CMO, advertising agent, ad network sales professional, or the like, may define a moment by selecting from a plurality of data applications, such as a weather application 204 and a stock market application 205, as shown. The user may further define the moment by selecting the current city 201 as Washington, D.C., the particular weather conditions as sunny and <15 degrees Celsius, and the particular stock as AOL Inc. The user may further refine the moment by selecting the particular gain margin for the stock selected, such as 5.00%. The user may select any number of data sources and may establish any number of criteria and/or conditions and is not limited to the number of sources recited herein.

Once the moment is defined by a plurality of criteria and/or conditions that may relate to a plurality of data applications, the collector 206 may fetch data from the selected data applications. For example, the collector 206 may continuously fetch data pertaining to the weather conditions of Washington D.C., and the stock performance of AOL Inc. on the New York Stock Exchange and store the data in a memory.

The comparator 207 may be configured to evaluate the data collected against the user defined conditions and/or criteria of the moment in order to determine whether the user defined moment has occurred. If the comparator 207 determines that a moment has occurred, the comparator 207 may be configured to send a signal to the executor 208. If the comparator 207 determines that a moment has not occurred, then the comparator 207 may continue to evaluate data obtained from the collector. The user database 203 may store various user profiles and may include information on users such as net worth, occupation, education, ethnic background, family information and other demographic information.

As one skilled in the art appreciates, the advertising moments platform 200 be implemented in hardware, software, or a combination of hardware and software. The hardware may include processors and memories configured to execute instructions stored in the memories. In one embodiment, the memories include computer-readable media that store a computer-program product having computer-useable instructions for a computer-implemented method. Computer-readable media include both volatile and nonvolatile media, removable and non-removable media, and media readable by a database, a switch, and various other network devices. Network switches, routers, and related components are conventional in nature, as are means of communicating with the same. Computer-readable media are computer-storage media. Computer-storage media include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory components can store data momentarily, temporarily, or permanently.

Figure 3:
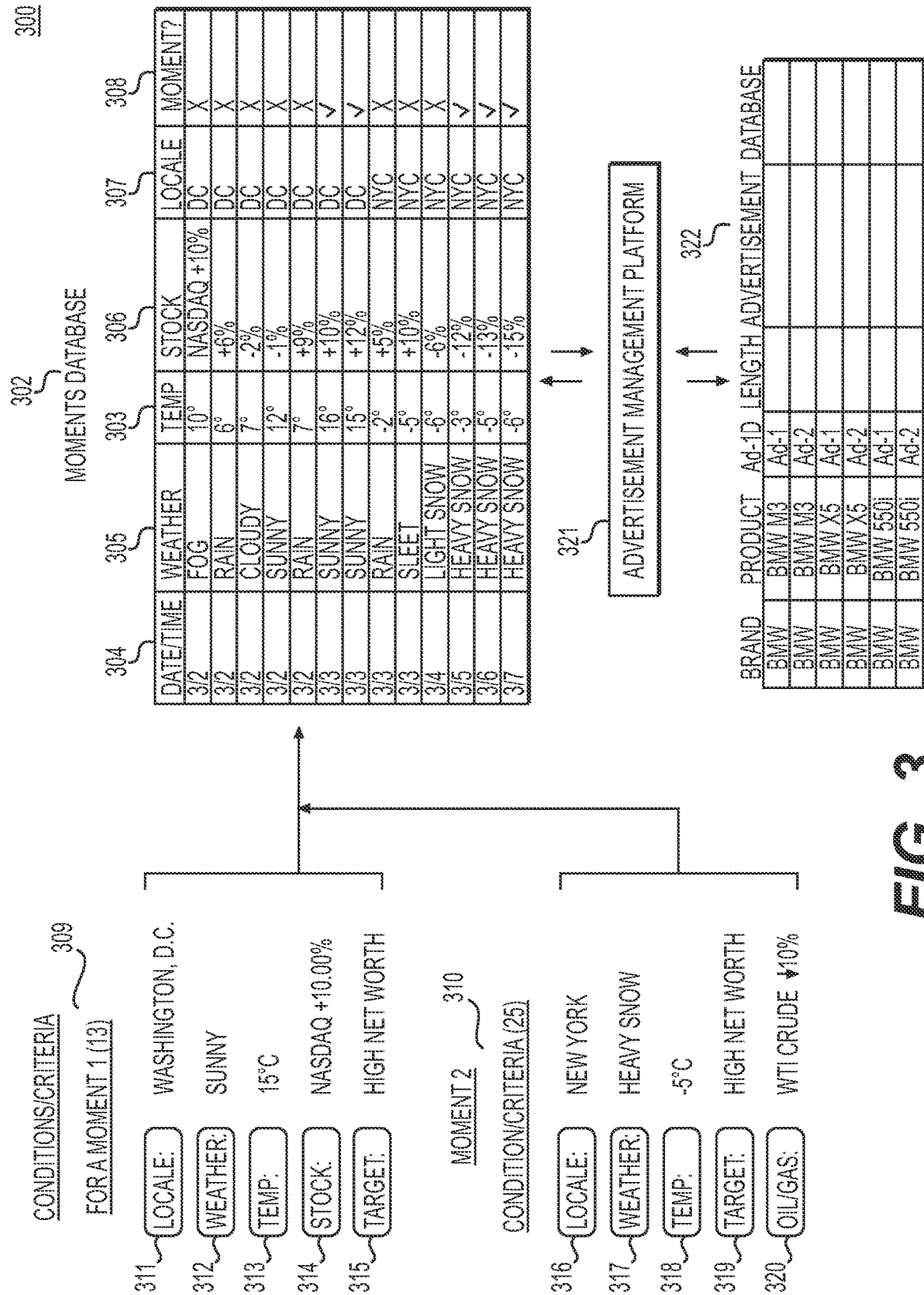
FIG. 3 depicts a schematic diagram that illustrates exemplary moments implemented by an advertisement management platform in a computing environment to target advertisements, according to exemplary embodiments of the present disclosure.

FIG. 3 is a schematic diagram 300 that illustrates exemplary conditions and/or criteria comprising moments that are evaluated by the advertisement management platform 321 of advertising moments platform 114, 200, according to embodiments of the present disclosure. As shown in FIG. 3, in one embodiment, the advertisement management platform 321 may be disposed in communication with a moments state database 302, a user database 323, user devices 324, and an advertisement database 322. The advertisement management platform 321 may receive data about any external conditions, e.g., the locale, weather, temperature, stock or oil prices, news events, etc., any of which may be evaluated to determine if a moment has occurred. The advertisement management platform 321 may also receive user profile and demographic data from the user database 323. In turn, the advertisement management platform 321 may provide appropriate advertisements tailored to a given identified moment to the user devices 324.

In one embodiment, external data may be collected in real time or at a predetermined interval and may be stored in the moments database 302 while associated with the time of retrieval. The moments database 302 may include a plurality of fields, comprising a date/timestamp field 304, data application fields 305, a geographic locale field 307, and a confidence field 308. The moments database may further include, but are not limited to, for example, weather fields 305, temperature fields 303, stock prices or oil/gas prices fields 306, sports scores, social media trends and political events. Any external data of moments database 302 may be processed to determine whether a moment has occurred or is currently occurring. The moments database 302 may continuously store fetched data from each of the selected data applications corresponding to a specific time increment. The time increments may be on the order of seconds, minutes, hours, or days. The data application may provide information on weather 305, and the moments database 302 may store the current weather conditions, i.e., fog, cloudy, rainy, sunny, partially cloudy, sleet, light snow, heavy snow, hail, or the like. The data application may provide information on temperature 303, and the moments database 302 may store the current temperature conditions, i.e. from the range between −40 C to +40 C. The data application may provide real time stock valuations for a particular stock 306, and the database may store the real time percent gain or losses at a given time interval. The user's GPS location or city 307 may also be stored in association with the retrieved data. The confidence field 308 may store the determination as to whether a defined moment has occurred based on evaluating each of the data application fields and the geographic location field 307. In one embodiment, when each of the fields satisfies the preset conditions, the advertisement management platform 321 selects the associated advertisement from the advertisement database 322 for transmission to the target user 324.

The advertisement management platform 321 may select an advertisement from the advertisement database 322 based a defined moment occurring. For instance, in one particular embodiment, the defined moment 309 may occur when, for example, in the locale 311 of Washington D.C., the weather 312 is sunny, the temperature 313 is above 15 degrees Celsius, the stock criteria 314 is a NASDAQ gain of 10.00% or larger, and the relevant user is categorized as being "high net worth." When these conditions are satisfied, the advertisement management platform 321 may trigger an advertisement for BMW featuring their new M3 sedan and select the advertisement from the advertisement database 322.

In another example, in one particular embodiment, a second defined moment 310 may occur when in the local 316 of New York City, the weather data 317 indicates heavy snow, the temperature 318 is 0 degrees Celsius or lower, and the oil/gas criteria 320 is met when a per gallon price of West Texas Intermediate Crude Oil falls by 5.00% or more. When these conditions are satisfied, and a "high net worth" web visitor is present, the advertisement management platform 321 may trigger an advertisement tailored for the criteria of that moment, say, for example, for a BMW advertisement featuring the X5 sport utility vehicle as selected from the advertisement database 322. If the one of the conditions ceases to be true, then the moment no longer occurs and the advertisement management platform 321 ceases to transmit the advertisement.

As shown in FIG. 3, in one embodiment, the advertisement database 322 may store an ID field and advertisement ID field 327, a moment field 328, a length field 326, a product field 329, a brand field 330 and an advertiser field 331. An order ID 332 field may identify each advertisement in the advertisement database 322. The moment ID 328 field stores the particular moment assigned to the advertisement. The advertiser field 331 stores the names of advertisements and targeting information stored in the advertisement data base. In certain embodiments, the advertisement database 322 includes a time field 326 that specifies a length of time for the advertisement campaign.

Figure 4:
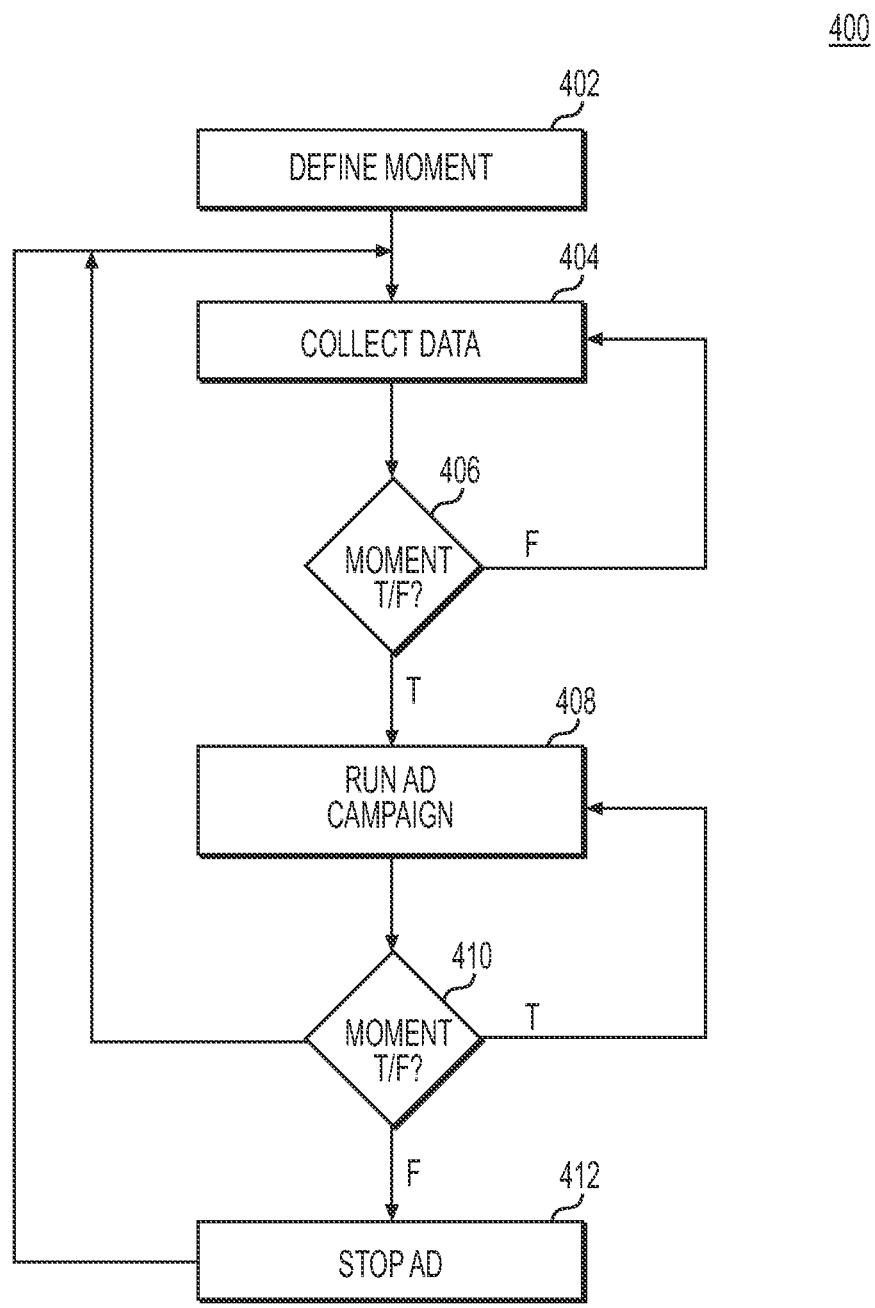
FIG. 4 depicts a flowchart illustrating an exemplary "moments" advertisement campaign method, according to exemplary embodiments of the present disclosure.

FIG. 4 is a flow chart that illustrates an exemplary computer implemented method for promoting an advertising campaign based on external factors, according to an exemplary embodiment. A plurality of moments may be defined in step 402. In turn, data is collected in step 404. In one embodiment, the collected data may be stored in a log similar to moments database 302 in FIG. 2. The collected data may include, but are not limited to, weather, temperature, stock prices, oil/gas prices, sports scores, social media trends, and political events. In step 406 the data may be evaluated against the specific conditions and/or criteria of the plurality of moments. If it is determined that no defined moment has occurred, then advertisement management platform returns to collecting data in step 404. If it determines that a defined moment has occurred, then the advertisement management platform may execute an advertisement campaign in step 408. In step 410 the collected data may be evaluated against the specific conditions and/or criteria of the moment for a second time. If it is determined that the moment is still occurring, then the advertisement campaign continues in step 408. If it is determined that the moment is no longer occurring, the advertisement is stopped in step 412, and the data is collected again in step 404.

Figure 5:
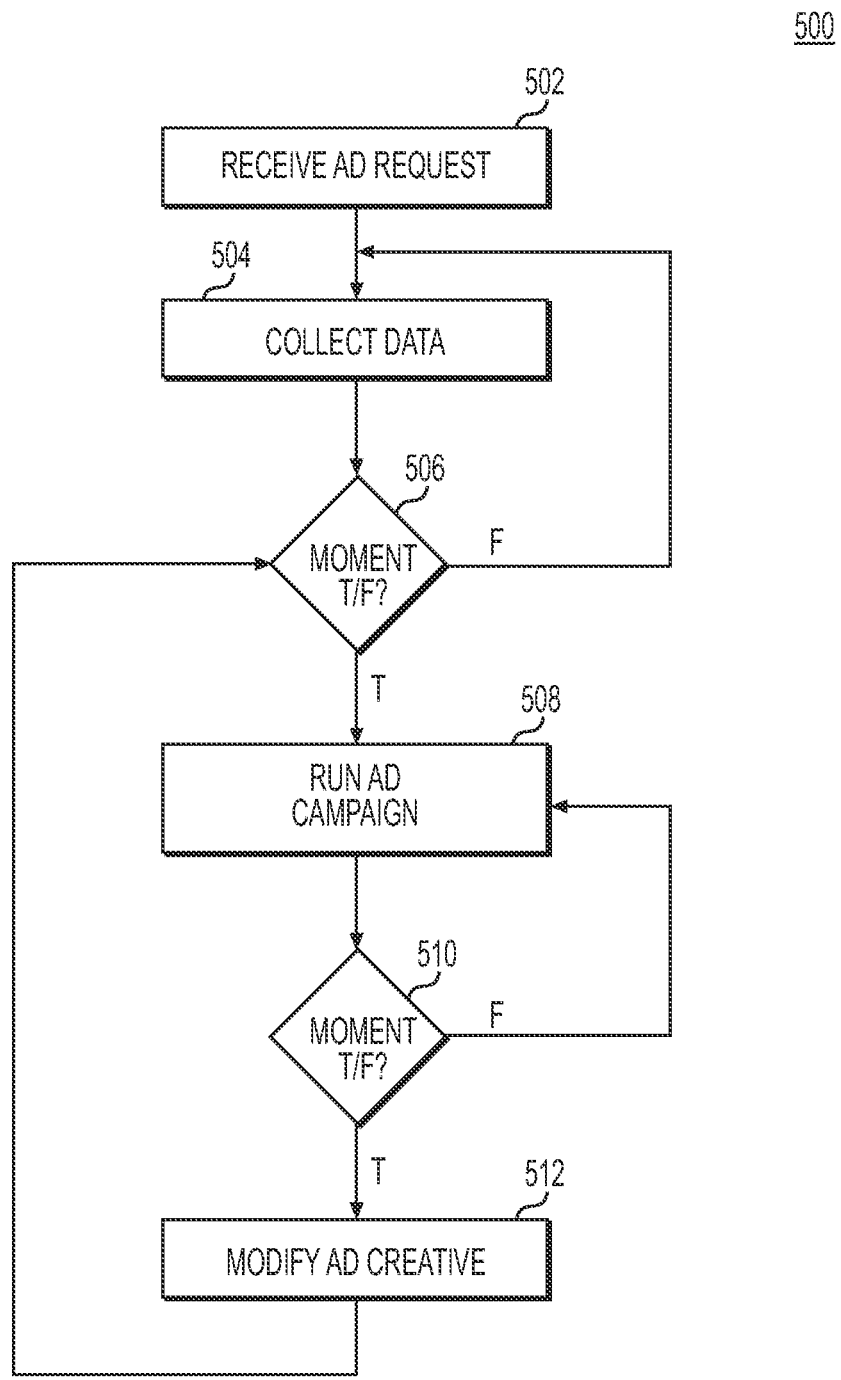
FIG. 5 depicts a flowchart illustrating an exemplary "moments" advertisement campaign method, according to exemplary embodiments of the present disclosure.

FIG. 5 is a flow chart illustrating an advertisement management platform 500 according to an exemplary embodiment. A request for an advertisement may be made in step 502. Data is collected from a plurality of applications in step 504. In step 506, the collected data may be then evaluated against conditions and/or criteria to determine if a defined moment has occurred. If it is determined that a defined moment has occurred, then the advertisement management platform 500 may execute a predefined advertisement campaign in step 508. If it is determined that a moment has not occurred, then the advertisement management platform 500 may return to step 504 and collect data until it is determined that a defined moment has occurred. If it is determined at step 508 that a moment has occurred, then the advertisement management platform 400 may run a designated advertisement campaign in step 510. Once the advertisement campaign is initiated, changes in external factors or data may result in corresponding changes to the advertisement creative as promoted through the advertisement campaign. For example, an advertiser may define additional moments that alter the advertisement creative. In step 512 the advertisement campaign is modified in accordance with the second moment.

In one exemplary embodiment, the second moment may be the occurrence of a vehicular accident on a major highway near a specified geographic locale. When the second moment occurs, the advertisement management platform may modify the advertisement campaign for a BWM X5 sport utility vehicle to feature information about the vehicle's safety systems, such as four-wheel drive, anti-lock breaks, a collision avoidance system, steel reinforced side doors, or the like. In another exemplary embodiment, an additional defined moment may be the occurrence of a major sporting event or international/national sporting competition. When the defined moment occurs, the advertisement management campaign may modify the advertisement creative to feature the functionality of the X5 vehicle including its capacity to carry sports equipment such as surfboards, skis or a canoe, or the like, or show images of a family where all the children are involved in a sport such as soccer, baseball or hockey.

In another exemplary embodiment, the advertiser is an automobile insurance company such as State Farm. Users may be targeted based on their profiles in a user database, specifically males less than 25 years old, and owners of sport sedans in the Washington D.C. area. The first moment may be defined by the following conditions and/or criteria: temperatures less than 0 degrees Celsius, with light to heavy snow. When the criteria/conditions of the first moment occur, the advertisement management campaign may promote a first advertisement featuring State Farm's insurance. The second moment may be defined when a number of accidents in the Washington D.C. exceeds a threshold value. When it is determined that the second moment occurs, the advertisement creative may be modified according to the second moment. For example, the advertisement creative may feature competitive rates for automobile insurance and highlight no-fault insurance or that the purchaser of the insurance will receive the full value of their vehicle after being involved in an accident.

In another exemplary embodiment, the target user may be homeowners in the metropolitan Washington D.C. area. The advertiser may be a home alarm system company. The first moment may be defined as occurring when the number of violent crimes exceeds 300 per 100,000 nationally. The statistics on national violent crime may be obtained from the FBI. When the first moment occurs, the advertisement management platform may begin a campaign featuring a specific company's home alarm system. The second moment may be defined as the number of break and enters in Washington D.C. for a given week. Data may be obtained from the Metropolitan Police Department website. When the second moment occurs, the advertisement creative may be modified to feature a burglar attempting to burglarize a family home but is instead turned away by the activation of the alarm system and the call to the police.

Figure 6:
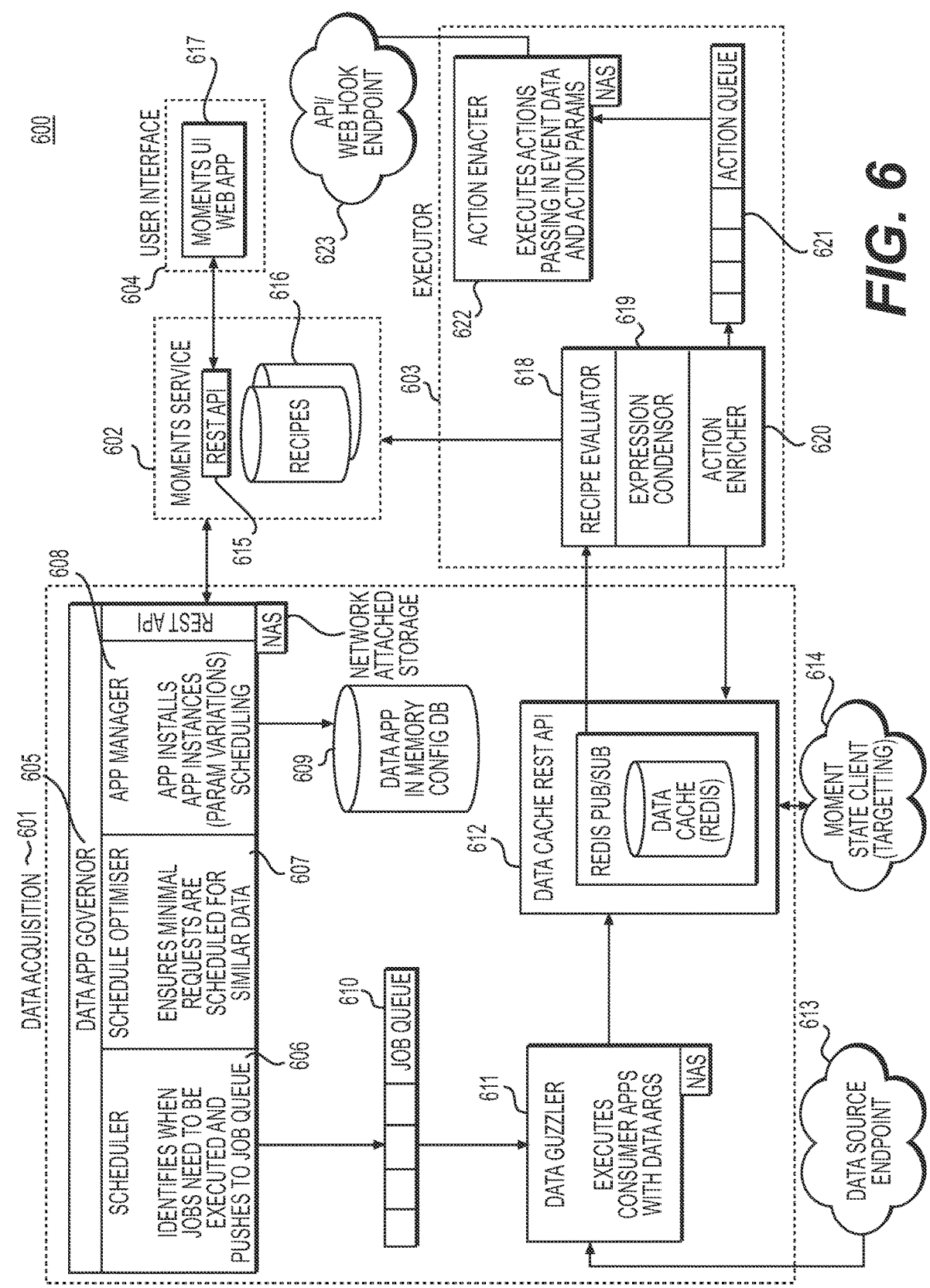
FIG. 6 depicts a block diagram of an exemplary advertisement management platform deployment executable in the "moments" systems of FIGS. 1 and 2, according to exemplary embodiments of the present disclosure.

FIG. 6 shows the system architecture of advertisement management platform, according to an exemplary embodiment. Note to Inventors: Please provide us with a functional description of the components in FIG. 6 and their relationship to the overall system. The advertisement management platform 600 may include a data acquisition component 601, a moments service component 602, an executor component 603, and a user interface component 604. The data acquisition component 601 is in communication with both the moments service component 602 and the executor component 603. The data acquisition component 601 may include a Data App Governor 605, a job queue 610, a Data App in-memory database 609, a data guzzler 611 and a data cache REST API 612. The user interface component 604 may be configured as a graphical tool to help users define and manipulate the moments. It may also be used to view data related to the installed data and action applications as well as analytics data pertinent to the history of the moments and actions that may have been executed in relation to the defined moment. The data app governor 605 may include a scheduler 606, a schedule optimizer 607, and an app manager 608. The data app governor 605 may receive configuration arguments applicable to data applications so that when a defined moment is configured and saved in the user interface, the data used to test a condition of a defined moment may be scheduled to be retrieved. The scheduler 606 may identify when jobs are to be executed, and push jobs data to the job queue 610. The scheduler 606 may be configured to identify when a piece of data is to be retrieved and may add a message to the job queue 610 indicating that the data guzzler 611 may retrieve the message identifying the data app and arguments used to retrieve the data from the data source. The job queue 610 may in turn push data to the data guzzler 611 which may execute consumer applications with data arguments. The job queue 610 may allow data requests to be queued. The data guzzler 611 may listen to the job queue 610 and may retrieve messages from the queue 610 when they appear. The job queue 610 may allow for a separation from the scheduler 606 so that multiple data guzzlers may be developed and the language may remain agnostic. Data source endpoint 613 may provide data to the data guzzler 611. The data guzzler 611 may retrieve messages from the job queue 610 and may use the message information to execute the appropriate data application along with the configured arguments that were setup from the user interface when defining the moment. The data guzzler 611 may subsequently save the resultant retrieved data into the cache data. The schedule optimizer 607 may ensure that minimal requests are scheduled for similar data. The schedule optimizer 607 may ensure that if data are already being retrieved for an existing active moment that no additional requests to the data source endpoint 613 may be made. This may reduce traffic to the data source endpoint 613, and may reduce cost implications if a data source endpoint 613 charges by request and may ensure that the data is only fetched once per time period as configured by the defined moment via the interface.

In some embodiments, the app manager 608 may install application instances. The app manager 608 may be in communication with the data app-in memory database 609. The app manager 608 may enable installation of new data and action application code, along with configuration information so that the user interface 604 may access available applications to be used in defined moments without having the applications explicitly installed at the point of software release. The app manager 608 may allow deployment of new applications without the need for a platform release of the moments user interface or the moments service. The data app-in memory database 609 may contain the installed application information and the state of the currently running moment. The data app-in memory database 609 may be used for returning information to the user interface 604 about available applications. It may additionally store the condition of the configured defined moments so that if the system is to be restarted, any scheduled jobs may be restarted to fetch data without losing any in-memory state. The data guzzler 611 may provide data to the date cache REST API 612. The data cache REST API 612 may store a history of the retrieved data for each data application and may make this information available for retrieval when a condition is evaluated. The moment status may also be stored in this database and may allow any external application to use it as a service to identify a moment's current state. The data cache REST API 612 may contain a Redis data structure server which receives external data from moment state client targeting component 614. The data source endpoint 613 may be an endpoint on a network (i.e., a web service), or a file on the file system. The data source 613 may be a source of information that can be accessed programmatically.

Moments service 602 may include data cache Rest API 615 and moment definitions or "recipes" 616. Executor component 603 may include a moment or recipe evaluator 618, an expression condenser 619, an action enricher 620, an action queue 621, and an action enactor 622. The defined moment or recipe evaluator 618 may subscribe to messages from the data cache REST API 615 so that when new data is retrieved from the data guzzler 611, moment definitions or recipes using the data may be checked along with all other conditions that were configured. In some embodiments, a moment definition or recipe may rely on weather information and/or stock information. If new weather data is retrieved and the data satisfies the weather condition of the moment, then the recipe evaluator may fetch the last stock data obtained and check whether it satisfied the condition defined in the moment. The expression condenser 619 may reduce execution by identifying recipes that use the same condition, and thus may perform a calculation when the condition has been satisfied once rather than for each recipe individually.

In some embodiments, action enricher 620 provides data to the action queue 621 which in turn, may provide data to the action enactor 622. The action enricher 620 may fetch any information pertinent to the data applications and the action applications so that the action enactor 620 may pass all information about the moment operations it executes. The action enactor 622 executes actions passing in event data and action parameters. The action enactor 622 may listen to when the action enricher 620 adds messages to the action queue 621. When a new message is added, it may retrieve the messages and retrieve the appropriate action application along with the arguments defined in the moment definition or recipe, as well as the data retrieved and used that identifies the moment condition as being satisfied. The action queue 621 may allow separation from the recipe evaluation so that multiple action enactors may be developed and the language may remain agnostic. Executor 603 may also be a connection to an API/webhook/endpoint 623. Moments service 602 may transfer data between the executor component 603 and the user interface 601. Moments service 602 may act as the backend for the moments user interface 601. A restful API 615 may be exposed to allow moments to be configured either via a front end consumer or by any restful client. It may be responsible for storing recipe information and facilitate the creation, modification, retrieval, and deletion of a moment.

Figure 7:
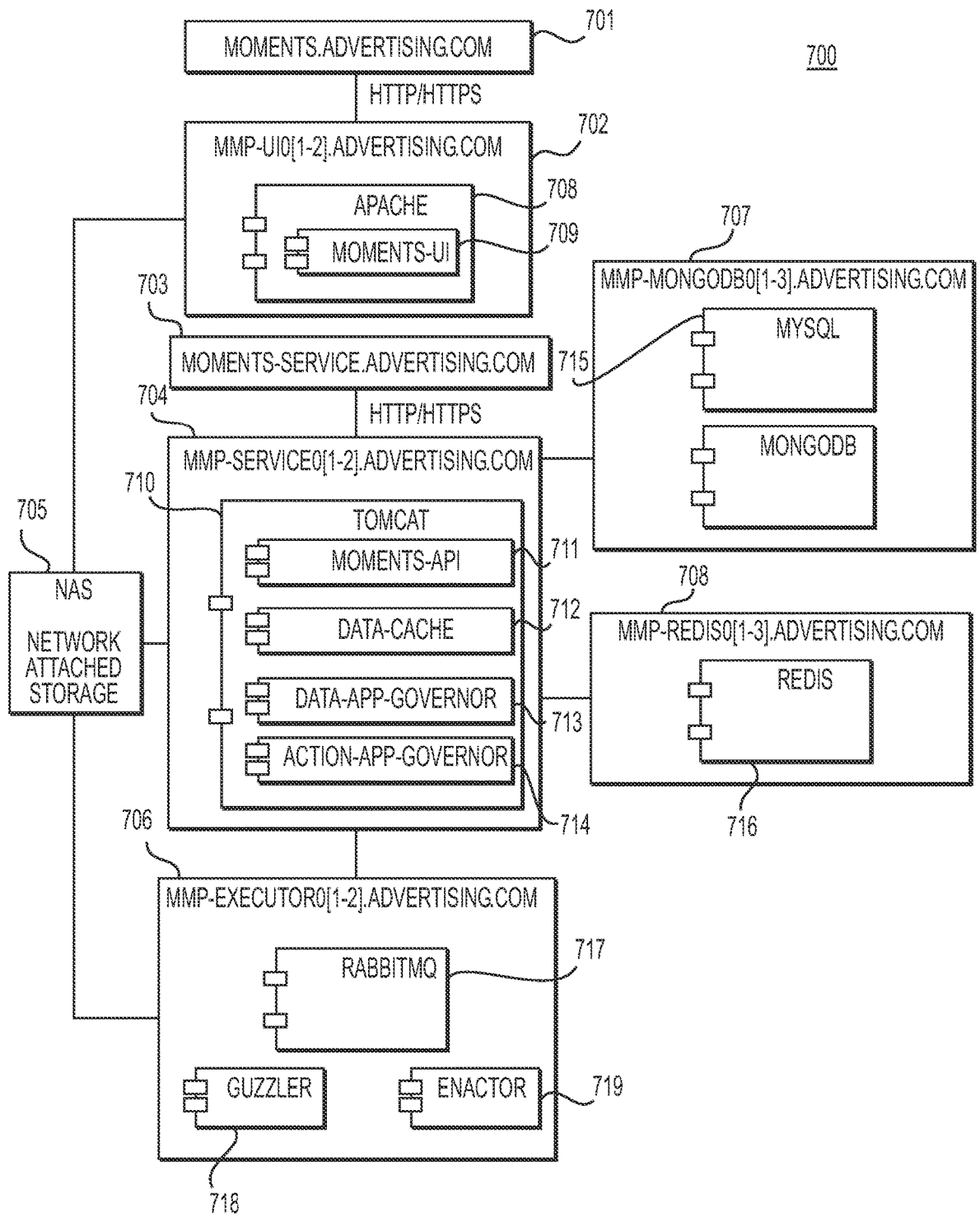
FIG. 7 depicts a block diagram of another exemplary advertisement management platform deployment executable in the "moments" systems of FIGS. 1 and 2, according to exemplary embodiments of the present disclosure.

FIG. 7 is a UML deployment diagram of the advertisement management platform 700 according to an exemplary embodiment. Note to Inventors: Please provide us with a functional description of the components in FIG. 7 and their relationship as part of the overall system. The advertisement management platform 700 may include a moments.advertising.com node 701, a mmp-u[1-2].advertising.com node 702, a moments-service.advertising.com node 703, an mmp-service0[1-2].advertising.com node 704, a mmp-executor0 [1-2].advertising.com node 706, an mmp-mongodb[1-3].advertising.com node 707, an mmp-redis0 [1-3].advertising.com node 708 and network attached storage 705. The mom ents.advertising.com node 701 may be the URL address at which the Moments UI Application may be accessed. The mmp-u[1-2].advertising.com node 702 may be the machines behind the load balancer which may be reached from moments.advertising.com and may include an Apache server 708 which includes a moment-ui 709 node. The mmp-u[1-2].advertising.com node 702 may run Apache servers responsible for responding to requests for the UI code. The moments-service.advertising.com node 703 may be served by a load balancer that passes requests from the user interface of rest API clients to the machines in 704. The mmp-service0[1-2].advertising.com node 704 may include a Tomcat server 710, which may further include a moments-api node, a data cache 712, a data-app-governor 713, and an action app governor 714. The mmp-service0[1-2].advertising.com node 704 may be the endpoint at which services supporting configuration of recipes are deployed and may run on an Apache Tomcat server. The mmp-service0[1-2] .advertising.com node 704 may be configured for data-cache, data application and action application governors. The mmp-executor0[1-2].advertising.com node 706 may include a RabbitMQ database, a governor 718, and an enactor 719. The mmp-executor0[1-2].advertising.com node 706 may run the code which executes the retrieval of data using the data applications, as well as execution of the application code for performing operations when recipes are deemed true. The mmp-mongodb[1-3].advertising.com node 707 may include a MySQL database 715 and a MongoDB database. The mmp-mongodb[1-3].advertising-.com node 707 may run MySQL and MongoDB to support API services and other application data requirements. The mmp-redis0[1-3].advertising.com node 707 may include a Redis database. The mmp-redis0[1-3].advertising.com node 708 may be a data store used by the data cache REST API 612 and may expose the Redis publisher/subscriber functionality listened to by the recipe evaluator 618.

Figure 8:
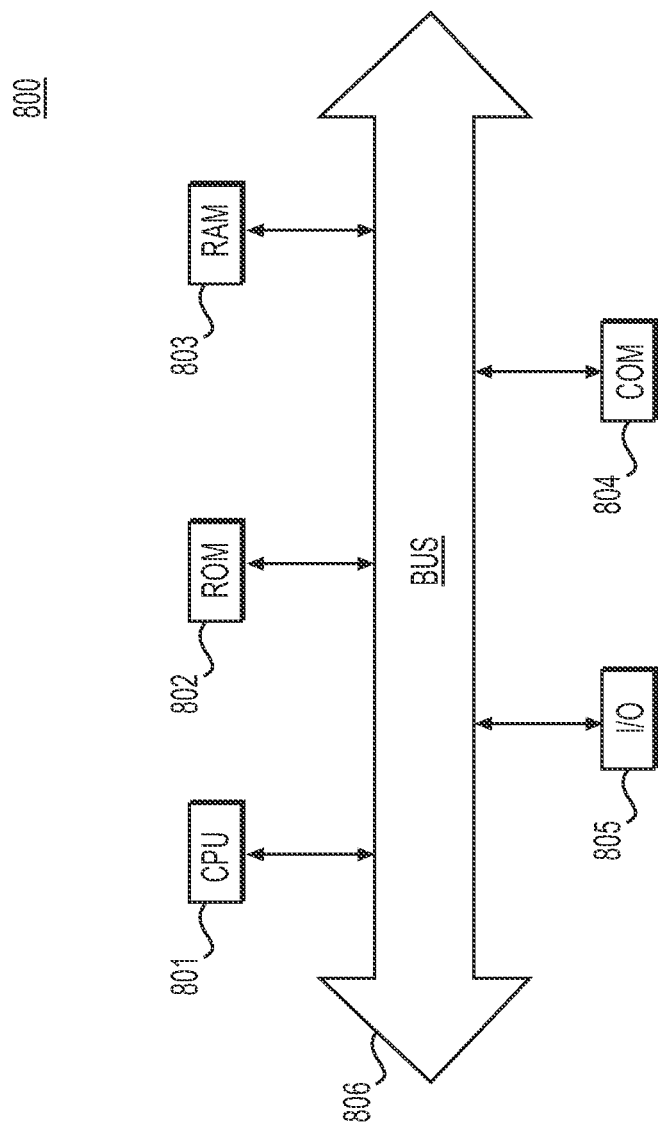
FIG. 8 depicts a simplified system architecture of the advertisement marketing platform, according to an exemplary embodiment.

As shown in FIG. 8, computer system 800 includes a central processing unit ("CPU") 801. CPU 801 may be any type of processor device including, for example, any type of special purpose or a general-purpose microprocessor device. As will be appreciated by persons skilled in the relevant art, CPU 801 also may be a single processor in a multi-core/ multiprocessor system, such system operating alone, or in a cluster of computing devices operating in a cluster or server farm. CPU 801 is connected to a data communication infrastructure 806, for example, a bus, message queue, network, or multi-core message-passing scheme.

Computer system 800 also includes a main memory 803, for example, random access memory ("RAM"), and may also include a secondary memory 802. Secondary memory 802, e.g., a read-only memory ("ROM"), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 802 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 800.

Computer system 800 may also include a communications interface ("COM") 804. Communications interface 804 allows software and data to be transferred between computer system 800 and external devices. Communications interface 804 may include a modem, a network interface (such as an Ethernet card), a communications port, a PCM-CIA slot and card, or the like. Software and data transferred via communications interface 804 may be in the form of signals, which may be electronic, electromagnetic, optical, or other signals capable of being received by communications interface 804. These signals may be provided to communications interface 804 via a communications path of computer system 800, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 800 also may include input and output ports 805 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

While principles of the current disclosure are described with reference to set-top boxes, it should be understood that the disclosure is not limited thereto. Rather, the systems and methods of the present disclosure may be used in any networked system providing playable media content.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A computer implemented method of providing advertisements to users, the method comprising:
    determining if a first plurality of conditions external to any computing device, system or network that provides or displays advertisements to users are satisfied;
    upon determining that the first plurality of conditions external to any computing device, system or network that provides or displays advertisements to users are satisfied, executing an advertisement campaign associated with an occurrence of the first plurality of conditions external to any computing device, system or network that provides or displays advertisements to users by transmitting an advertisement associated with the first plurality of conditions external to any computing device, system or network that provides or displays advertisements to users to a targeted user;
    displaying the advertisement to the user;
    determining if a second plurality of conditions external to any computing device, system or network that provides or displays advertisements to users are satisfied; and
    upon determining that the second plurality of conditions external to any computing device, system or network that provides or displays advertisements to users are satisfied, determining, based on the second plurality of conditions external to any computing device, additional information other than the second plurality of conditions external to any computing device, and modifying the displayed advertisement to include the additional information.

2. The computer implemented method of claim 1, further comprising:
    collecting data associated with the first plurality of conditions external to any computing device, system or network that provides or displays advertisements to users,
    wherein the collected data is stored in a log.

3. The computer implemented method of claim 2, wherein the collected data comprises meteorological data, weather conditions, temperature conditions, stock market prices, oil and gas prices, sports scores and data, or social media trends.

4. The computer implemented method of claim 1, wherein the first plurality of conditions relate to specific weather conditions, temperature conditions, stock market prices, oil and gas prices, sports scores and data, or social media trends.

5. The computer implemented method of claim 1, wherein the advertisements are stored in an advertisement database and are associated with the first or second plurality of conditions external to any computing device, system or network that provides or displays advertisements to users.

6. The computer implemented method of claim 1, wherein the transmitting to a target user comprises determining the target user by geographic location, net worth, or other demographic factors.

7. The computer implemented method of claim 6, wherein a target user's profile is stored in a server.

8. The computer implemented method of claim 1, wherein the modifying of the advertisement is further correlated to changes in the first plurality of conditions or an occurrence of additional conditions external to any computing device, system or network that provides or displays advertisements to users.

9. A computer system, the computer system comprising:
    a data storage device that stores instructions for providing advertisements to targeted users; and
    a processor configured to execute the instructions to perform a method including:
    determining if a first plurality of conditions external to any computing device, system or network that provides or displays advertisements to users are satisfied;
    upon determining that the plurality of conditions external to any computing device, system or network that provides or displays advertisements to users are satisfied, executing an advertisement campaign associated with an occurrence of the first plurality of conditions external to any computing device, system or network that provides or displays advertisements to users by transmitting an advertisement associated with the first plurality of conditions external to any computing device, system or network that provides or displays advertisements to users to a targeted user;
    displaying the advertisement to the user;
    determining if a second plurality of conditions external to any computing device, system or network that provides or displays advertisements to users are satisfied; and
    upon determining that the second plurality of conditions external to any computing device, system or network that provides or displays advertisements to users are satisfied, determining, based on the second plurality of conditions external to any computing device, additional information other than the second plurality of conditions external to any computing device, and modifying the displayed advertisement to include the additional information.

10. The computer system of claim 9, further comprising:
    collecting data associated with the first plurality of conditions external to any computing device, system or network that provides or displays advertisements to users,
    wherein the collected data is stored in a log.

11. The computer system of claim 10, wherein the collected data comprises meteorological data, weather conditions, temperature conditions, stock market prices, oil and gas prices, sports scores and data, or social media trends.

12. The computer system of claim 9, wherein the first plurality of conditions relate to specific weather conditions, temperature conditions, stock market prices, oil and gas prices, sports scores and data, or social media trends.

13. The computer system of claim 9, wherein the advertisements are stored in an advertisement database and are associated with the first or second plurality of conditions external to any computing device, system or network that provides or displays advertisements to users.

14. The computer system of claim 9, wherein the transmitting to a target user comprises determining the target user by geographic location, net worth, or other demographic factors.

15. The computer system of claim 9, wherein a target user's profile is stored in a server.

16. The computer system of claim 9, wherein the modifying of the advertisement is further correlated to changes in the first plurality of conditions or an occurrence of additional conditions external to any computing device, system or network that provides or displays advertisements to users.

17. A non-transitory computer-readable medium storing instructions that, when executed by a computer, cause the computer to perform a method for of providing advertisements to users, the method comprising:

determining if a first plurality of conditions external to any computing device, system or network that provides or displays advertisements to users are satisfied;

upon determining that the first plurality of conditions external to any computing device, system or network that provides or displays advertisements to users are satisfied, executing an advertisement campaign associated with an occurrence of the first plurality of conditions external to any computing device, system or network that provides or displays advertisements to users by transmitting an advertisement associated with the first plurality of conditions external to any computing device, system or network that provides or displays advertisements to users to a targeted user;

displaying the advertisement to the user;

determining if a second plurality of conditions external to any computing device, system or network that provides or displays advertisements to users are satisfied; and upon determining that the second plurality of conditions external to any computing device, system or network that provides or displays advertisements to users are satisfied, determining, based on the second plurality of conditions external to any computing device, additional information other than the second plurality of conditions external to any computing device, and modifying the displayed advertisement to include the additional information.

* * * * *